United States Patent [19]

Hirotomi

[11] Patent Number: 5,101,144
[45] Date of Patent: Mar. 31, 1992

[54] ULTRASONIC MOTOR DRIVING CIRCUIT
[75] Inventor: Jun Hirotomi, Tokyo, Japan
[73] Assignee: Seiko Instruments Inc., Japan
[21] Appl. No.: 427,004
[22] Filed: Oct. 25, 1989
[30] Foreign Application Priority Data Oct. 27, 1988 [JP] Japan .................. 63-271387

[51] Int. Cl.$^5$ ........................................ H01L 41/08
[52] U.S. Cl. ............................ 318/116; 310/316; 310/317
[58] Field of Search .................. 310/323, 316, 317; 318/116, 118

[56] References Cited

U.S. PATENT DOCUMENTS

| 4,468,581 | 8/1984 | Okada et al. | 310/316 |
| 4,692,649 | 9/1987 | Izukawa et al. | 310/317 X |
| 4,743,788 | 5/1988 | Takagi et al. | 310/316 |
| 4,833,358 | 5/1989 | Suzuki et al. | 310/316 |
| 4,888,514 | 12/1989 | Takahashi et al. | 310/316 |
| 4,914,337 | 4/1990 | Takagi et al. | 310/316 |
| 4,926,084 | 5/1990 | Furutsu et al. | 310/316 |

OTHER PUBLICATIONS

Patent Abstracts of Japan, vol. 13, No. 68 (E-716) [3416] Feb. 16, 1989.
Patent Abstracts of Japan, vol. 13, No. 518 (E-848) [3866] Nov. 20, 1989.
Patent Abstracts of Japan, vol. 13, No. 564 (E-860) [3912] Dec. 14, 1989.

Primary Examiner—Mark O. Budd
Attorney, Agent, or Firm—Bruce L. Adams; Van C. Wilks

[57] ABSTRACT

An ultrasonic motor driving circuit for driving an ultrasonic motor of the type wherein a progressive wave or standing wave is excited on the surface of a flexible member by applying a frequency voltage to a piezoelectric element of an oscillation member and drives a moving member which is brought into pressure contact with the oscillation member, the driving circuit comprising a register for converting a current flowing through the piezoelectric device to a voltage signal, reference voltage generator for generating a reference potential for rectification and amplification, rectifying amplifier connected to the register for rectifying and amplifying the voltage signal, voltage control type oscillator for generating a frequency signal in accordance with the output of the rectifying amplifier, frequency divider for frequency-dividing the output signal of the oscillator, phase distributor for advancing or delaying phase of the signal of the frequency divider, and booster connected to the phase distributor for amplifying signals of the phase distributor to apply them to the piezoelectric element of the ultrasonic motor.

19 Claims, 9 Drawing Sheets (i) Vret, V'm, Vm (V) vs TIME (sec)

(ii) fout (iii) fout/2

(iv) CK1

(v) CK2

ULTRASONIC MOTOR DRIVING CIRCUIT

BACKGROUND OF THE INVENTION

This invention relates to a driving circuit of an ultrasonic motor utilizing a piezoelectric device.

An ultrasonic motor applies a frequency voltage to a piezoelectric device, oscillates a flexible member to excite a progressive wave and drives frictionally a moving member brought into pressure contact with the oscillation member.

The driving principle of the ultrasonic motor using the piezoelectric device as the driving source in the present invention will be explained. FIG. 17 shows an example of the principle of generation of a progressive wave in an ultrasonic motor of a progressive wave system. Reference numeral 171 represents the piezoelectric device. As shown in the drawing, it is polarized equidistantly with a width b and the polarization directions adjacent to one another are mutually opposite. An electrode 172 is formed by applying a conductive material such as silver to each piezoelectric device by technique such as vacuum deposition or plating and these electrodes are connected by signal lines 173, 174 and are driven by different signal sources, respectively. A portion having a width C is disposed in the electrode group wired by the signal lines 173, 174. Therefore, the center distance between the electrodes interposing C is a. It will be hereby assumed that the portion having the width C may or may not have polarization and electrode. The mechanism of generation of the progressive wave will be explained on the basis of the drawing and signals described above. The bend oscillation wave consisting of the progressive wave and the backward wave (having the opposite traveling direction to the progressive wave) can be expressed as follows on the basis of the piezoelectric device portion ① in FIG. 17 as the reference:

$$A \sin(\omega t - Kx) + A \sin(\omega t + Kx) \quad (1)$$

Here, the formula (1) represents a so-called "steady wave". In contrast, the bend oscillation wave due to the piezoelectric device ② can be expressed as follows:

$$B \sin(\omega t - K(x+a) + \phi) + B \sin(\omega t + K(x+a) + \phi) \quad (2)$$

where $K = \omega/\gamma = 2\pi/\lambda$
$\lambda$: one wave length
$\phi$: phase difference angle with respect to the wave due to the piezoelectric device ①.

If the following relation is established in the formula (2), $$-Ka + o = a\pi \quad (3)$$
$$Ka + o = \beta\pi$$

then, the formula (2) can be expressed as follows:

$$B \sin(\omega t - Kx + a\pi) + B \sin(\omega t + Kx + \beta\pi) \quad (4)$$

Therefore, the bend oscillation wave excited by ① and ② is the sum of the formula (1) and (4).

If the condition which permits the existence of only the progressive wave is considered from the expansion of the formula (4), it can be understood that such a condition is in the cases where $a$ is an even-numbered multiple of $\frac{1}{2}$ and $\beta$ is an odd-numbered multiple of $\frac{1}{2}$.

From the formula (3), a and $\phi$ can be expressed as follows by the formulas of $\alpha$ and $\beta$:

$$a = /4(\beta - \alpha) \quad (5)$$
$$o = /2(\alpha + \beta)$$

In other words, when $(\alpha, \beta)=(0, 1)$, $a=\lambda/4$, $\phi=\pi/2$ and when $(\alpha, \beta)=(2, 1)$, $a=\frac{3}{4}$, $\phi=3/2$, and when these a and o are satisfied simultaneously, there exists the progressive wave. For instance, if the case where $a=\frac{3}{4}$, $b=\lambda/2$ and $\phi=3/2$ is considered, the formulas (1)+(2) become as follows:

$$A \sin(\omega t - Kx) + A \sin(\omega t + Kx) + B \sin(\omega t - Kx) - B \sin(\omega t + Kx) \quad (6).$$

Here, if the amplitudes A and B of both signals outputted from the driving circuit are A=B, it can be understood that the formula (6) becomes 2Asin($\omega t - Kx$) and only the progressive wave component remains. To attain reverse driving, only the backward wave may be left. Therefore, $\alpha$ and $\beta$ in the formula (5) may be reversed so that $\alpha$ is an odd-numbered multiple of $\frac{1}{2}$ and $\beta$ is an even-numbered multiple of $\frac{1}{2}$. If consideration is made on the basis of ① in practice, the phase of the signal applied to ② may be deviated by 180° in comparison with the case of the normal driving.

FIG. 18 shows the principle of the rotation of the ultrasonic motor by the progressive wave. In the drawing, reference numeral 181 represents a stator or in other words, an oscillation member. When the progressive wave occurs on the basis of the principle shown in FIG. 17, one point on the surface portion describes an elliptical orbit in a leftward direction so that a moving member portion represented by 182 moves in a direction opposite to the traveling direction of the progressive wave. Since the above is described in "Nikkei Mechanical" (Sept. 23, 1985) and the detailed description of how the point on the surface describes the elliptical orbit is also given in this reference, the explanation will be hereby omitted.

The amplitude of the frequency of the oscillation member attains maximum at the mechanical resonance frequency of an oscillation member (flexible member + piezoelectric device) and driving force sufficient to drive the moving member can first be extracted by applying this resonance frequency or a frequency voltage approximate to the former to the piezoelectric device. It has been customary to measure the resonance frequency of the oscillation member by use of an FFT analyzer or the like, to impress the frequency in match with this resonance frequency to the piezoelectric device and to drive the moving member.

The resonance frequency of an ultrasonic motor changes in accordance with an ambient temperature or with the temperature change resulting from exothermy of the oscillation member itself. Since the moving member is brought into pressure contact with the oscillation member, the resonance frequency changes with this pressing force, too. Furthermore, the resonance frequency changes with a frequency voltage. The relationship is shown in FIGS. 10 and 11.

If the frequency of the frequency voltage applied to the piezoelectric device is fixed as has been made in the prior art technique, the driving force drops drastically and the motor stops if the resonance frequency of the ultrasonic motor changes.

SUMMARY OF THE INVENTION

It is therefore an object of the invention to provide an ultrasonic motor driving circuit which stably drives the ultrasonic motor when the oscillation member temperature, an applied frequency voltage and/or contact pressure between the oscillation member and the moving member is changed.

It is another object of the invention to provide an ultrasonic motor driving circuit which changes the frequency of the frequency voltage to be applied to the piezoelectric device in match with the resonance frequency of the ultrasonic motor to maintain applying at all times the frequency near the resonance frequency of the ultrasonic motor to the piezoelectric device when the latter changes.

These and other objects of the invention are achieved by an ultrasonic motor driving circuit which comprises a monitor register serially connected to the piezoelectric element of the ultrasonic motor to convert consumed current of the piezoelectric element to a voltage, a voltage control type oscillator (VCO) coupled to the register for generating a frequency signal in accordance with the inputted voltage.

The driving circuit having the construction described above converts a consumed current of the ultrasonic motor to a voltage by use of the monitor resistor and rectifies and amplifies the voltage signal converted by the resistor from the current, inputs it to the VCO as a control voltage and feeds back the increase and decrease in the consumed current so that the output frequency of VCO is always near the resonance frequency of the ultrasonic motor. According to the construction described above, the impression frequency on the piezoelectric device of the oscillation member can always be kept near the resonance frequency and the ultrasonic motor can be driven stable and efficiently.

DETAIL DESCRIPTION OF THE PREFERRED EMBODIMENT

Hereinafter, an embodiment of the present invention will be described with reference to the drawings.

Figure 1:
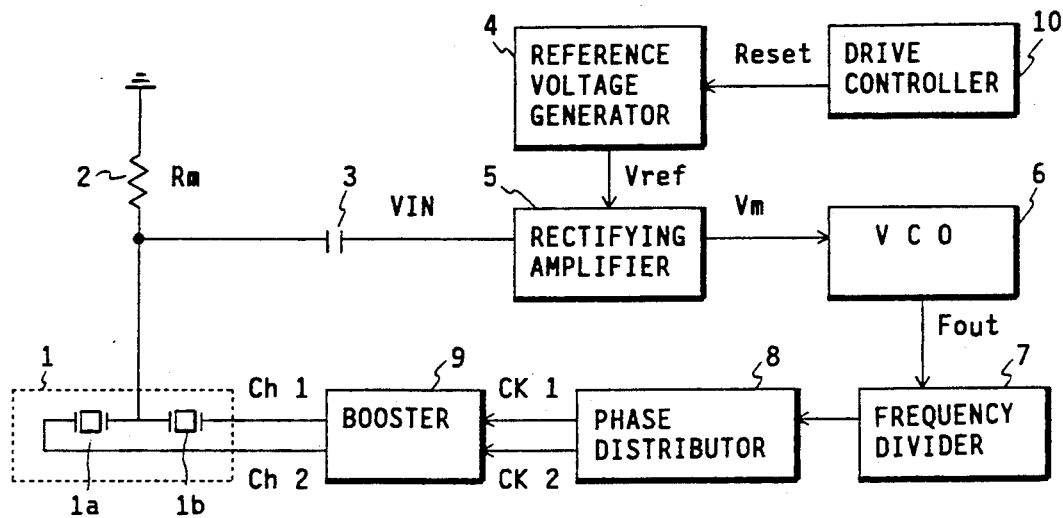
FIG. 1 is a functional block diagram showing a typical embodiment of the present invention.

FIG. 1 shows a typical embodiment of the present invention. In the drawing, reference numeral 1 represents the ultrasonic motor, which represents a piezoelectric device having piezoelectric elements 1a and 1b. The common electrode of the piezoelectric elements 1a, 1b is grounded through a resistor 2. When a frequency voltage is applied to the piezoelectric device 1 from booster means 9, the current flows through the resistor 2. When the current flows through the resistor 2, a voltage difference occurs across both of its ends.

Figure 2:
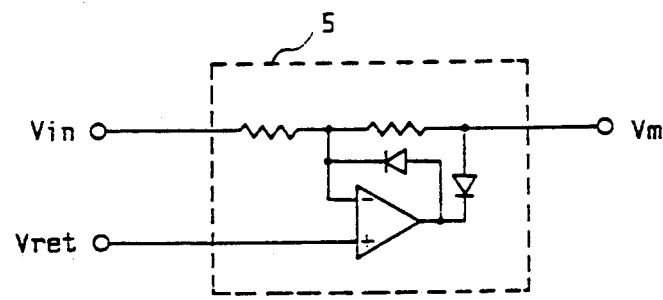
FIG. 2 is a circuit diagram showing an example of half-wave amplification means.
Figure 3:
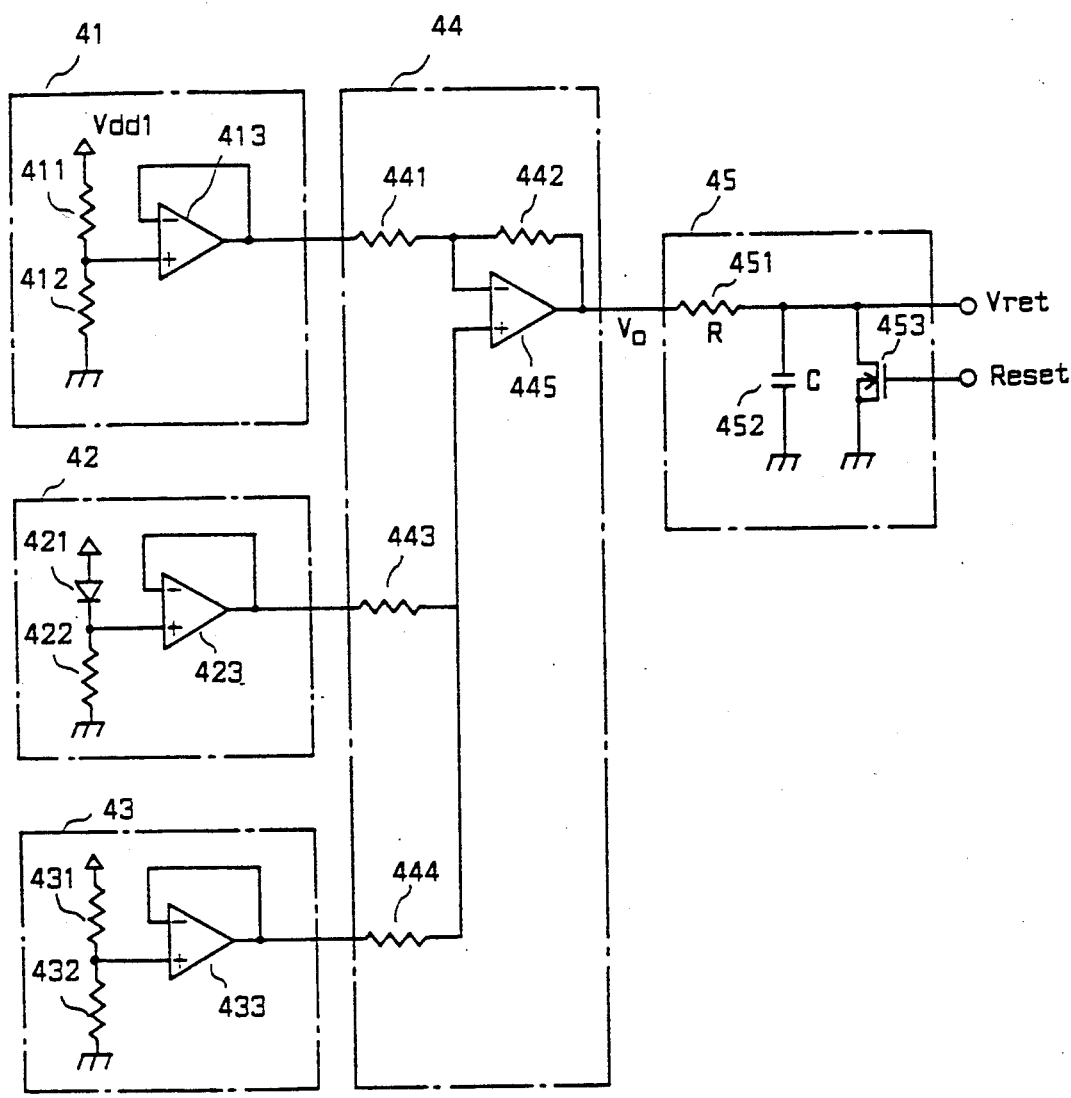
FIG. 3 is a circuit diagram showing reference voltage generation means.
Figure 7:
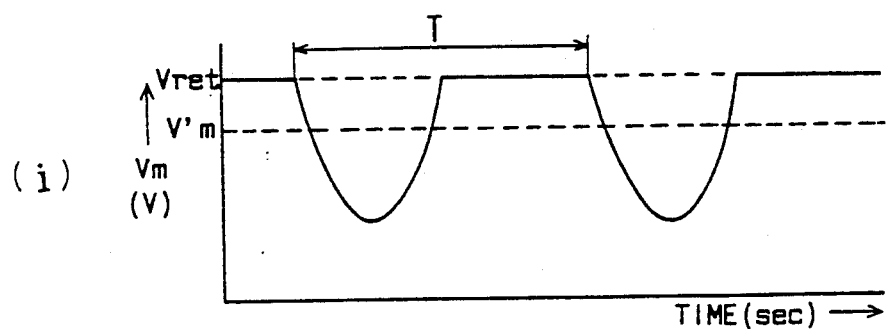
FIG. 7 is a time chart showing the voltage waveform of the output Vm of the half-wave amplification circuit (FIG. 2) and the output waveform when Vm is inputted to VCO.
Figure 7:
Figure 7:
Figure 7:
Figure 7:

The voltage difference at this time is given by ixRm with i representing the current. A voltage signal proportional to the current i is obtained at the resistor 2 and this signal is inputted into rectification-amplification means 5 through a coupling capacitor 3 and rectified and amplified by the means 5. An example of the rectification-amplification means is shown in FIG. 2. The rectified and amplified waveform Vm by the circuit shown in FIG. 2 is shown in FIG. 7(i). A reference voltage $V_{ref}$ at the time of rectification and amplification is inputted from reference voltage generation means 4. The reference voltage generating means is shown in FIG. 3. The reference voltage generating means comprises first voltage generator 41 for generating a voltage in accordance with a driving voltage (Vddl) of an ultrasonic motor, second voltage generator 42 for generating a voltage in accordance with an ambient temperature having a temperature sensor 421, third voltage generator capable of setting an arbitrary voltage, addition/subtraction circuit 44 for adding or subtracting the first, second and third voltage to or from each other respectively and voltage control means coupled to said addition/subtraction circuit for changing a voltage from a predetermined voltage to the output voltage of the addition/subtraction circuit with a certain specific constant having outputting switch circuit 453 responsive to inputting a Reset signal from a driving controllor.

Figure 4:
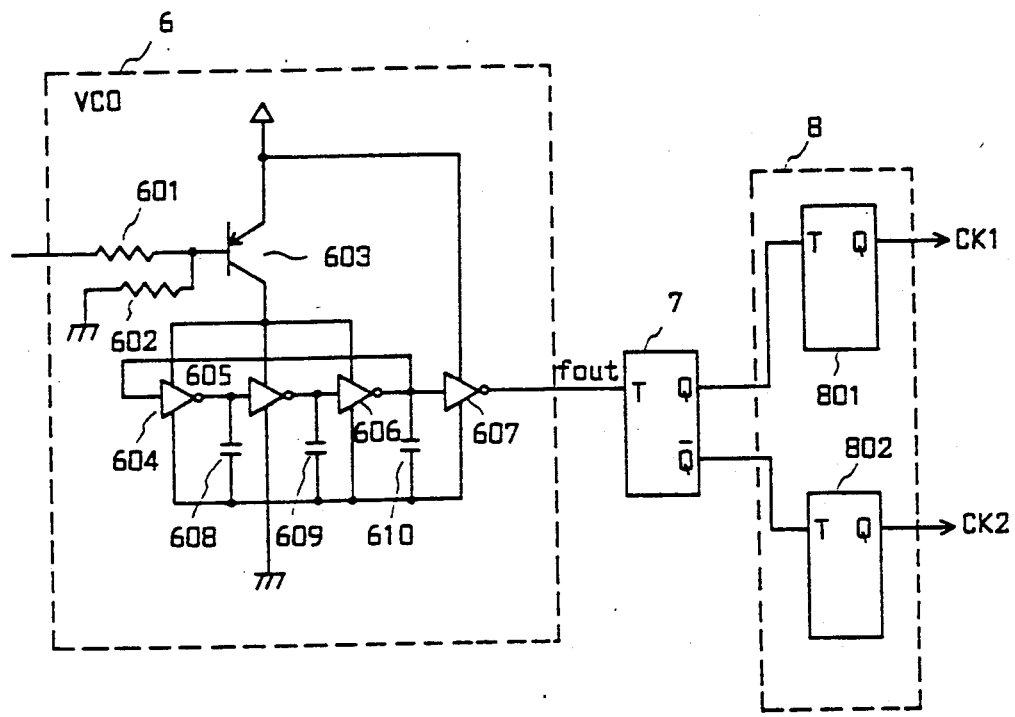
FIG. 4 is a circuit diagram showing an example of VCO having a negative gradient.

The output Vm of the rectification-amplification means 5 is inputted as a frequency control voltage to VCO 6. The output Vm is an A.C. signal but the mean output frequency of VCO 6 is a frequency corresponding substantially to the frequency of the mean voltage V'm when is averaged Vm. Frequency division means 7 divides the frequency of the output $f_{out}$ of VCO 6. Upon receiving the output of this means 7, phase distribution means 8 generates a reference signal and a signal which is either advanced or delayed by a ¼ period with respect to the reference signal. FIG. 4 shows the circuits of VCO 6, the frequency division means 7 and the phase distribution means 8 described above.

Figure 5:
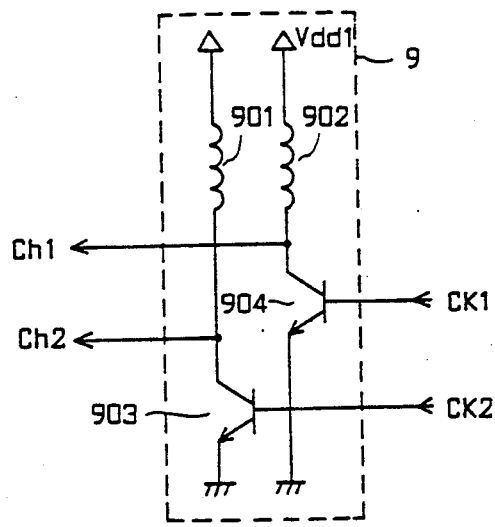
FIG. 5 is a circuit diagram showing an example of booster means.

Booster means 9 receives two signals CK1 and CK2 of the phase distribution means 8, raises the voltage and applies them to the piezoelectric element 1. An example of the booster means 9 is shown in FIG. 5.

Figure 6:
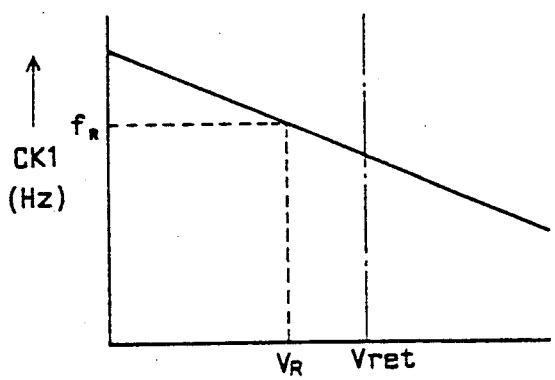
FIG. 6 is a diagram showing the relationship between the voltage of VCO shown in FIG. 4 and the frequency $f_R$.

FIG. 6 is a diagram showing the relationship between the impressed voltage of VCO 6 and the output frequency after frequency division. The diagram shows also the resonance frequency $f_R$ of the ultrasonic motor, the impressed voltage $V_R$ of VCO at that time and the reference potential $V_{ref}1$ set by the reference potential generation means 4.

The relational formula of this diagram is expressed as follows for convenience sake:

$$CK1 = aV_m + b \text{ (Hz)} \quad (1)$$

a: gradient coefficient
b: frequency when Vm=0 V.

The current waveform of the ultrasonic motor is an A.C. signal and the voltage signal Vm obtained by rectifying and amplifying this signal is also an A.C. signal as shown in FIG. 7(i). If this Vm is directly inputted to VCO, a frequency signal in match with the value Vm is outputted as shown in (ii). The waveform shown in (iii) is obtained by dividing the frequency by ½ of this waveform and a signal CK1 (CK2) shown in (iv) is obtained by further dividing the frequency of the former.

If the V-F characteristics of VCO 6 are expressed by a linear expression, the frequency of CK1 (CK2) is the same as when Vm is applied as in the form of A.C., the same also holds the when voltage V'm is obtained by smoothing Vm.

In other words, the formula (1) also can be expressed as follows, too, with V'm representing the smoothed voltage of Vm:

$$Ck1 = aV'm + b \quad (2).$$

Next, the amplitude of Vm changes with the consumed current of the ultrasonic motor and its smoothed voltage V'm can be expressed as follows:

$$V'm = V_{ref} - \frac{I \cdot R_m \cdot A}{\pi} \quad (3)$$

where
I: consumed current of ultrasonic motor
$R_m$: resistance value of current monitor resistance 2
A: degree of amplification of rectification-amplification means The following formula (4) can be obtained by putting the formula (3) into the formula (2):

$$Ckl = a\left(V_{ref} - \frac{I \cdot R_m \cdot A}{\pi}\right) + b \quad (4)$$

$(I \cdot R \cdot A)/\pi$ is a feedback item due to the increase or decrease of the consumed current I.

Figure 8:
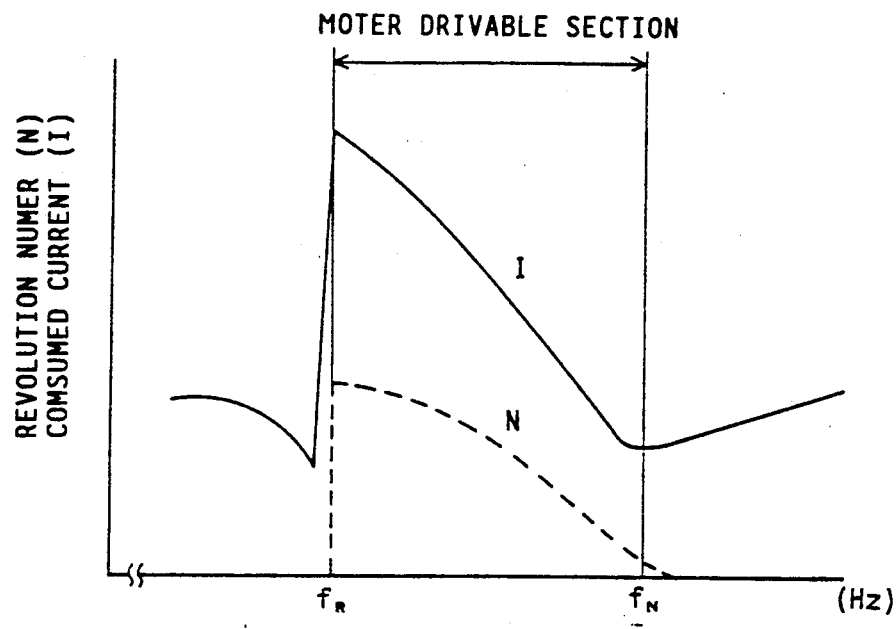
FIG. 8 is a diagram showing the relationship between the driving frequency of the ultrasonic motor and the consumed current and the number of revolution of a moving member.

FIG. 8 describes the relationship between the driving frequency of the ultrasonic motor with respect to the consumed current and the number of the revolution of the moving member. The motor is capable to be driven in the section from $f_R$ to $f_n$, and at frequencies higher than $f_n$ and lower than $f_R$, the motor can not be driven. The rotation number and consumed current become maximum at the resonant frequency $f_R$.

Figure 9:
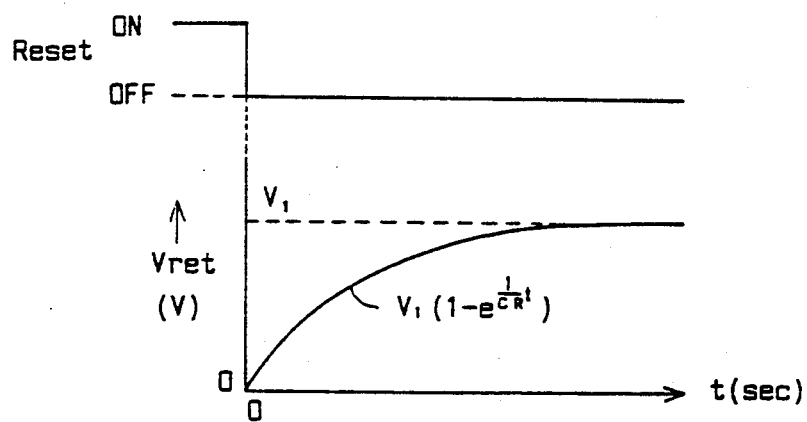
FIG. 9 is a time chart showing the change of the reference potential $V_{ref}$ after a Reset signal changes from 1 to 0 in FIG. 3.

When the Reset signal changes from 0 to 1 in FIG. 4, $V_{ref}$ rises gradually from 0 V with a time constant CR. (The change of $V_{ref}$ is shown in FIG. 9.) The frequency of CK1 output from VCO drops gradually in accordance with this change and comes near to the resonance frequency $f_R$, and the current I flowing through the piezoelectric device of the ultrasonic motor increases too. When I increases, the drop of CK1 (CK2) becomes smaller due to the formula (4).

$CK_1$ must be larger than or equal to $f_R$ to drive the moving member (see FIG. 8).

$$CK_1 \geq f_R \quad (5a)$$

The following formula (5b) can be obtained by putting the formula (2) and (3) into the formula (5a):

$$a\left(V_{ref} - \frac{I \cdot R_m \cdot A}{\pi}\right) + b \geq aV_R + b \quad (5b)$$

The following formula (5c) can be obtained by modifying the formula (5b):

$$V_{ref} \leq V_R + \frac{I \cdot R_m \cdot A}{\pi} \quad (5c)$$

To drive stably the moving member, the following formula must be satisfied:

$$V_0 \leq V_{Rm} + \frac{I \cdot R \cdot A}{\pi} \quad (5c')$$

The maximum of the $(I \cdot R \cdot A)/\pi$ is $I_{max} \cdot R \cdot (A/\pi)$, thus;

$$V_0 \leq V_{Rm} + I_{max} \cdot R \cdot \frac{A}{\pi} \quad (5)$$

On the other hand, from the formula (3):

$$V_0 \geq V_R \quad (5d).$$

Thus; $V_0$ must satisfy the following formula:

$$V_{Rm} \leq V_0 \leq V_{Rm} + I_{max} \cdot R \cdot \frac{A}{\pi} \quad (5e)$$

Here, if the relation of the formula (5e) is satisfied with $I_{max}$ being the maximum value of the current I, CK1 (CK2) gets stable at a frequency a little bit higher than the resonance frequency $f_R$.

Accordingly, if $V_0$ is set to a level higher than $V_R$ so that the value $V_0 - V_R$ does not exceed $I_{max} \cdot R_m \cdot (A/\pi)$, the frequency CK1 (CK2) of the output frequency of VCO after frequency division becomes stable near the resonance frequency of the ultrasonic motor.

Figure 10:
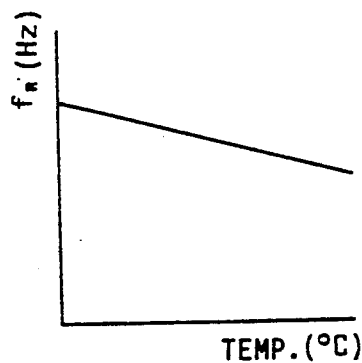
FIG. 10 is a diagram showing the relationship between a temperature and the resonance frequency of the ultrasonic motor.

When the ambient temperature changes, $f_R$ changes, too, (with the relation shown in FIG. 10). The change of $f_R$ means the change of $V_R$ from the characteristics of VCO shown in FIG. 6 and if $V_{ref}$ and $I_{max}$ are constant, $V_0 - V_R$ changes, too, so that the relation of the formula (5e) cannot be satisfied from time to time. In the present invention, therefore, second voltage generation means 42 for generating a voltage corresponding to the temperature having the temperature sensor 421 is disposed in the reference voltage generation means 4 shown in FIG. 4 and this voltage is added to $V_{ref}$. Accordingly, $V_0$ follows up the change of $V_R$ due to the temperature change and the relation of the formula (5) can be maintained.

Figure 11:
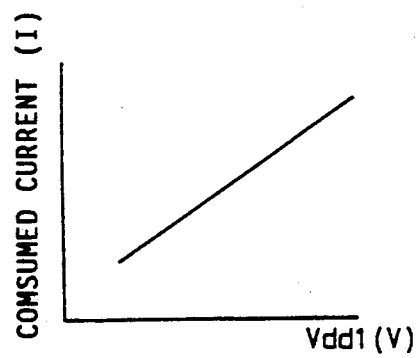
FIG. 11 is a diagram showing the relation between the driving voltage of the ultrasonic motor and the consumed current.

When the applied voltage Vddl (Vddl in FIG. 5) to the ultrasonic motor changes, $f_R$ and $I_{max}$ change, too. This relationship is shown in FIG. 11. The relationship shown in FIG. 5 cannot sometimes be satisfied due to the change of the impressed voltage. However, the present invention disposes the first voltage generation means 41 for generating a predetermined voltage in accordance with the value of Vddl as shown in FIG. 3 so as to change $V_0$ in accordance with the value of Vddl. Accordingly, the relationship of the formula (5) can be maintained.

Figure 12:
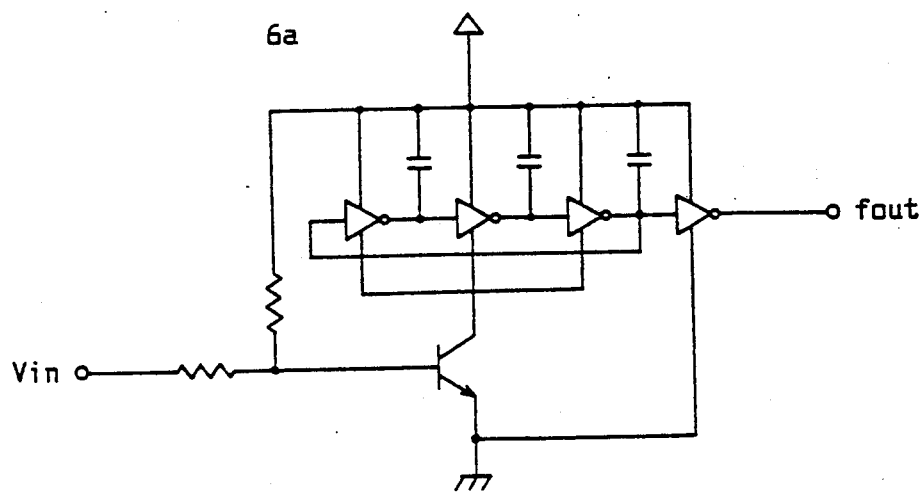
FIG. 12 is a circuit diagram showing an example of VCO having a positive gradient.
Figure 13:
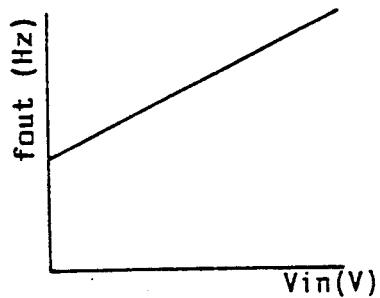
FIG. 13 is a diagram showing the relation between the voltage of VCO shown in FIG. 12 and the frequency.
Figure 14:
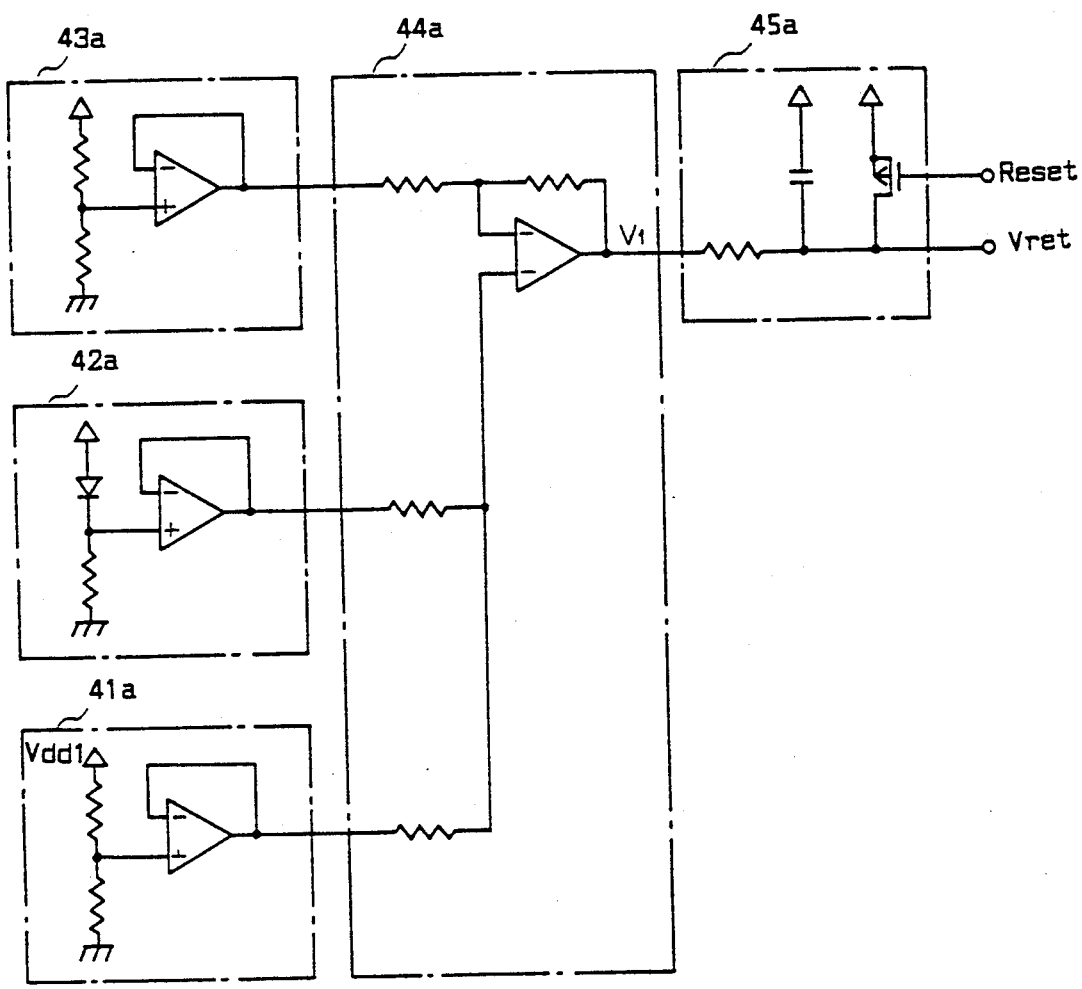
FIG. 14 is a circuit diagram showing a reference voltage ($V_{ref}$) generation circuit when VCO shown in FIG. 12 having the characteristics of FIG. 13 is used.
Figure 15:
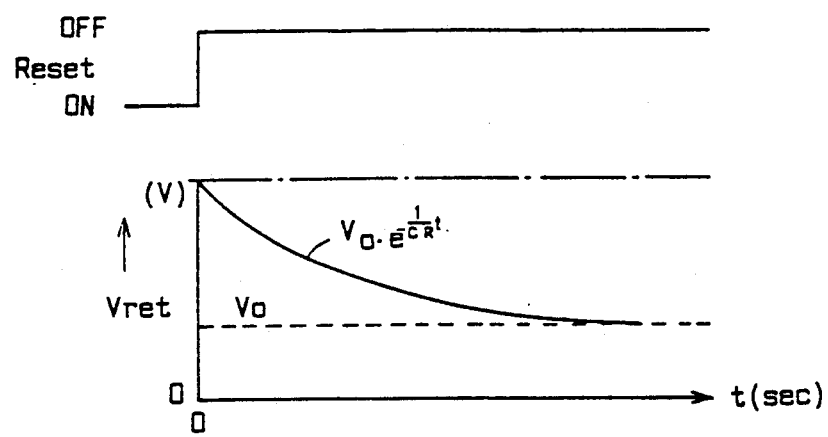
FIG. 15 is a time chart showing the change of the reference voltage $V_{ref}$ after the Reset signal changes from 1 to 0 in FIG. 14.
Figure 16:
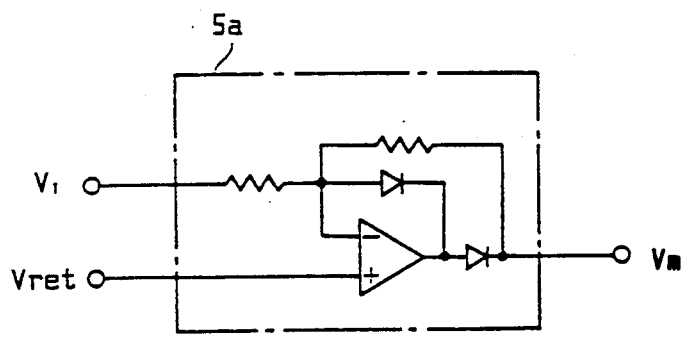
FIG. 16 is a circuit diagram showing an example of half-wave amplification means when VCO shown in FIG. 12 having the characteristics of FIG. 13 is used.
Figure 17:
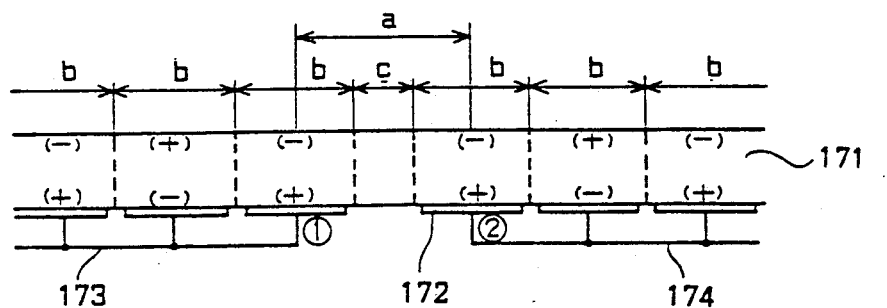
FIG. 17 is a diagram showing an example of the generation principle of a progressive wave.
Figure 18:
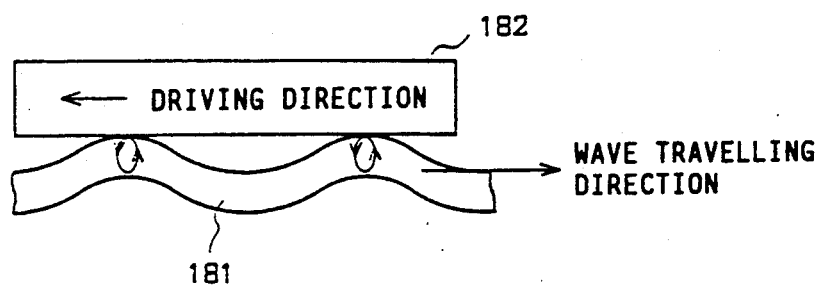
FIG. 18 is an explanatory view showing an example of the principle of rotation of the progressive wave operation motor.

Though the embodiment described above deals with the case of VCO whose voltage-vs-frequency characteristics have a negative gradient, the same operation can be attained when they have a positive gradient, too. An example of VCO at this time is shown in FIG. 12. An example each of the reference voltage generation means and half-wave amplification means is shown in FIG. 14 or 16.

When the ultrasonic motor is driven, the present invention can change the driving frequency in accordance with the change of the resonance frequency due to the temperature and the driving voltage, the driving frequency is always set near to the resonance frequency and can efficiently drive the ultrasonic motor.

What is claimed is:

1. An ultrasonic motor driving circuit for driving an ultrasonic motor of the type wherein a progressive wave or standing wave is excited on the surface of a flexible member by applying a frequency voltage to a piezoelectric element of an oscillation member and drives a moving member which is brought into pressure contact with said oscillation member, said driving circuit comprising;
    a resistor for converting a current flowing through said piezoelectric element to a voltage signal;
    reference voltage generation means for generating a reference potential for rectification and amplification, the reference voltage generation means including voltage control means for changing an output voltage from a predetermined voltage to a constant output voltage with a certain time constant;
    rectifying amplifier means connected through a coupling capacitor to said resistor for rectifying and amplifying the voltage signal;
    voltage control type oscillation means for generating a frequency signal in accordance with the output of said rectifying amplifier means;
    frequency division means for frequency-dividing the output signal of said oscillation means;
    phase distribution means for advancing or delaying the phase of the signal of said frequency division means; and
    booster means connected to said phase distribution means for amplifying signals of said phase distribution means to apply them to the piezoelectric element of the ultrasonic motor.

2. An ultrasonic motor driving circuit as claimed in claim 1 wherein said reference voltage generation means includes first voltage generation means for generating a voltage in accordance with a driving voltage of the ultrasonic motor.

3. An ultrasonic motor driving circuit as claimed in claim 1 wherein said reference voltage generation means includes second voltage generation means for generating a voltage in accordance with an ambient temperature.

4. An ultrasonic motor driving circuit as claimed in claim 3 wherein said second voltage generation means has a temperature sensor.

5. An ultrasonic motor driving circuit as claimed in claim 1 wherein said reference voltage generation means includes means for generating a voltage which is higher than a controlled voltage of said voltage control type oscillation means at the time when said oscillation means outputs a signal having an ultrasonic resonance frequency so that the difference between the generated voltage and the control voltage is smaller than a predetermined value.

6. An ultrasonic driving circuit as claimed in claim 5 wherein said predetermined value is proportional to a maximum consumed current of the ultrasonic motor.

7. An ultrasonic motor comprising:
    an oscillation member including a flexible member and a piezoelectric element bonded to said flexible member for generating a progressive wave or standing wave on the surface of said oscillation member;
    a moving member movable into pressure contact with said oscillation member; and
    a driving circuit for applying a frequency voltage to said piezoelectric element, said driving circuit including a resistor for converting a current flowing through said piezoelectric element to a voltage signal; voltage control type oscillation means coupled to said voltage signal for generating a frequency signal in accordance with the voltage signal; and drive signal generating means coupled to said oscillation means for generating a driving signal from the input frequency signal while maintaining said input frequency signal so to apply both signals to the piezoelectric element of said ultrasonic motor.

8. An ultrasonic motor as claimed in claim 7 further comprising reference voltage generating means for generating a reference potential for rectification and amplification; and rectifying amplifier means connected to said resistor for rectifying and amplifying the voltage signal.

9. An ultrasonic motor as claimed in claim 7 wherein said drive signal generating means includes frequency division means for frequency-dividing the output signal of said oscillation means, phase distribution means connected to said frequency division means for advancing or delaying the phase of the output signal of said frequency division means, and booster means connected to said phase distribution means for amplifying signals of said phase distribution means to apply them to the piezoelectric element of the ultrasonic motor.

10. An ultrasonic motor as claimed in claim 8 wherein said reference voltage generation means includes first voltage generation means for generating a voltage in accordance with a driving voltage of the ultrasonic motor.

11. An ultrasonic motor as claimed in claim 8 wherein said reference voltage generation means includes second voltage generation means for generating a voltage in accordance with an ambient temperature.

12. An ultrasonic motor as claimed in claim 11 wherein said second voltage generation means has a temperature sensor.

13. An ultrasonic motor as claimed in claim 8 wherein said reference voltage generation means includes voltage control means for changing an output voltage from a predetermined voltage to a constant output voltage having a specific time constant.

14. An ultrasonic motor as claimed in claim 8 wherein said reference voltage generation means includes means for generating a voltage which is higher than a controlled voltage of said voltage control type oscillation means at the time when said oscillation means outputs a signal of ultrasonic resonance frequency so that the difference between the generated voltage and the control voltage is smaller than a predetermined value.

15. An ultrasonic motor as claimed in claim 14 wherein said predetermined value is proportional to a maximum consumed current value of the ultrasonic motor.

16. An ultrasonic motor driving circuit for driving an ultrasonic motor of the type wherein a progressive wave or standing wave is excited on the surface of a flexible member by applying a frequency voltage to a piezoelectric element of an oscillation member to drive a moving member which is in pressure contact with said oscillation member, said driving circuit comprising:
    a resistor for converting a current flowing through said piezoelectric element to a voltage signal;
    reference voltage generating means for generating a reference potential for rectification and amplification, said reference voltage generating means including voltage control means for changing an output voltage from a predetermined voltage to a constant output voltage having a specific time constant;
    rectifying amplifier means connected to said resistor for rectifying and amplifying the voltage signal;
    a coupling capacitor connected to said rectifying amplifier means and said resistor for coupling said rectifying amplifier means with said voltage signal by means of said resistor;
    voltage control type oscillation means connected to said rectifying amplifier means;
    frequency division means connected to said voltage control type oscillation means for frequency-dividing the output signal of said oscillation means;
    phase distribution means connected to said frequency division means for advancing or delaying the phase of the signal of said frequency division means; and
    booster means connected to said phase distribution means for amplifying signals of said phase distribution means and applying the boosted signals to said piezoelectric element of the ultrasonic motor.

17. An ultrasonic motor driving circuit as claimed in claim 16; wherein said piezoelectric element has two electrodes, each electrode receiving a separate signal from said booster means; and
    wherein said resistor is connected between said electrodes and to said coupling capacitor at one end and is connected to ground at the other end such that current output by the ultrasonic motor divides across the resistor and coupling capacitor.

18. An ultrasonic motor driving circuit as claimed in claim 17; wherein said reference voltage generation means includes first voltage generation means for generating a voltage in accordance with a driving voltage of the ultrasonic motor;
    second voltage generation means for generating a voltage proportional to ambient temperature; and
    third voltage generation means for generating an arbitrary voltage.

19. An ultrasonic motor driving circuit as claimed in claim 18; wherein said second voltage generating means has a temperature sensor.

* * * * *